United States Patent [19]

Grosz et al.

[11] Patent Number: 5,082,413
[45] Date of Patent: Jan. 21, 1992

[54] BALE CARRYING APPARATUS

[75] Inventors: Clifford C. Grosz, 122 ½ 8th St., Harvey, N. Dak. 58341; Jeffrey Schilling, Martin, N. Dak.

[73] Assignee: Clifford C. Grosz, Harvey, N. Dak.

[21] Appl. No.: 486,058

[22] Filed: Feb. 27, 1990

[51] Int. Cl.$^5$ .............................................. A01D 90/12
[52] U.S. Cl. .................................. 414/24.5; 414/621; 414/721; 414/731; 294/119.1
[58] Field of Search ....................... 414/24.5, 621, 622, 414/731, 626, 911, 722, 724, 721, 920; 294/67.22, 62.33, 119.1

[56] References Cited

U.S. PATENT DOCUMENTS

| | | | |
|---|---|---|---|
| 2,706,570 | 4/1955 | Jewell | 414/621 |
| 3,877,595 | 4/1975 | Edelman . | |
| 3,880,305 | 4/1975 | Van Polen . | |
| 3,908,846 | 9/1975 | Brummitt . | |
| 4,024,970 | 5/1977 | Schirer | 414/621 X |
| 4,032,184 | 6/1977 | Blair . | |
| 4,120,405 | 10/1978 | Jones | 414/721 X |
| 4,194,863 | 3/1980 | Vansickle et al. . | |
| 4,252,358 | 2/1981 | Klebs | 294/67.33 |
| 4,257,732 | 3/1981 | Staffanson . | |
| 4,334,817 | 6/1982 | Vansickle et al. . | |
| 4,364,700 | 12/1982 | Arabshian et al. . | |
| 4,367,062 | 10/1983 | Duenow . | |
| 4,411,571 | 7/1984 | Gildon . | |
| 4,459,075 | 10/1984 | Eichenberger . | |
| 4,478,547 | 10/1984 | Den Boer . | |
| 4,537,549 | 8/1985 | Knels . | |
| 4,564,325 | 1/1986 | Ackerman . | |
| 4,578,008 | 3/1986 | Gleason . | |
| 4,594,041 | 6/1986 | Hostetler | 414/911 X |
| 4,597,703 | 7/1986 | Bartolini . | |
| 4,634,336 | 1/1987 | Pearce . | |
| 4,710,091 | 12/1987 | Ochiai | 294/119.1 X |

FOREIGN PATENT DOCUMENTS

| | | | |
|---|---|---|---|
| 3409516 | 9/1985 | Fed. Rep. of Germany | 414/920 |
| 3826173 | 10/1989 | Fed. Rep. of Germany | 414/667 |
| 1279946 | 12/1986 | U.S.S.R. | 414/621 |

OTHER PUBLICATIONS

The 84 Bale Mover and Feeder brochure (SM6375) from John Deere and Company (copyright John Deere and Co., Jun. 1989).
The Worksaver Bale Handling Equipment brochure from Worksaver, Inc., Litchfield, Ill. (Form 3939W-10M) (Copyright Worksaver, Inc., Oct. 1986).
The Bale Claw brochure from Worksaver, Inc., Litchfield, Ill., (Copyright on or before Dec. 26, 1989 by Worksaver, Inc.).
The Worksaver Bale Hugger flier from Worksaver, Inc., Litchfield, Ill. (Copyright on or before Dec. 26, 1989 by Worksaver, Inc.).

Primary Examiner—David A. Bucci
Assistant Examiner—Craig Slavin
Attorney, Agent, or Firm—Merchant, Gould, Smith, Edell, Welter & Schmidt

[57] ABSTRACT

An apparatus for carrying large-diameter bales for attachment to a front end loader including a support frame for attachment to the loader, forwardly extending support arms for supporting a bale generally from underneath, first and second forwardly extending gripping arm spaced apart to receive a bale therebetween. Manipulation structure slides the gripping arms to vary the distance therebetween, so that the device may effectively handle bales of varying width or in lengthwise and endwise orientation.

13 Claims, 5 Drawing Sheets

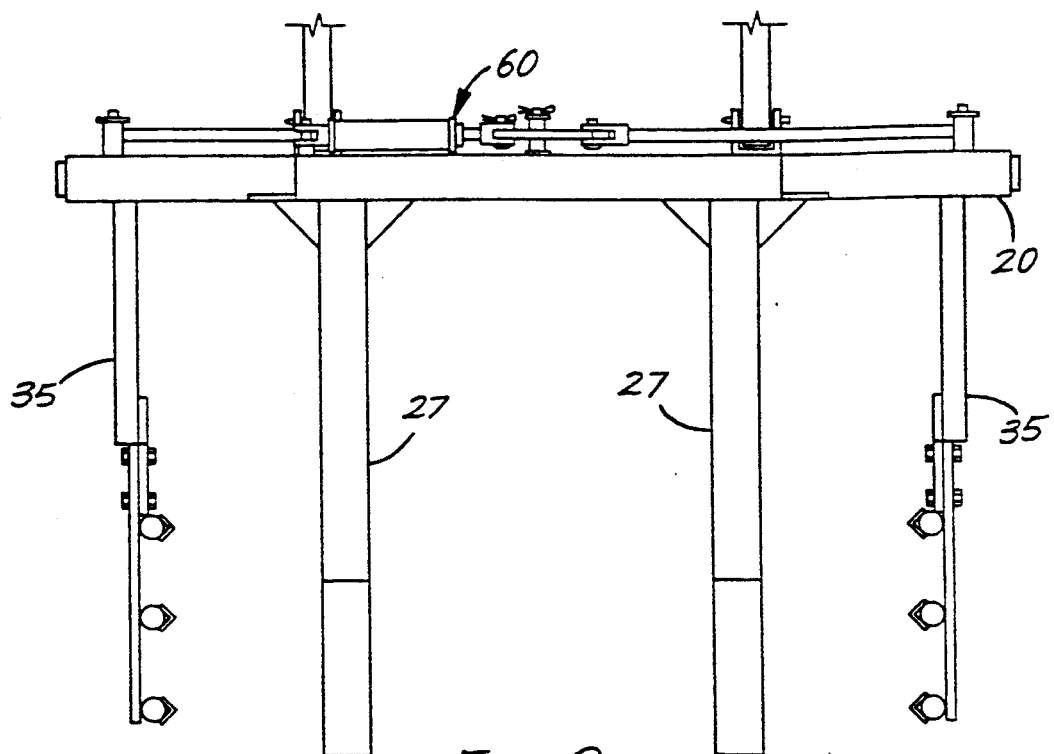
FIG. 2
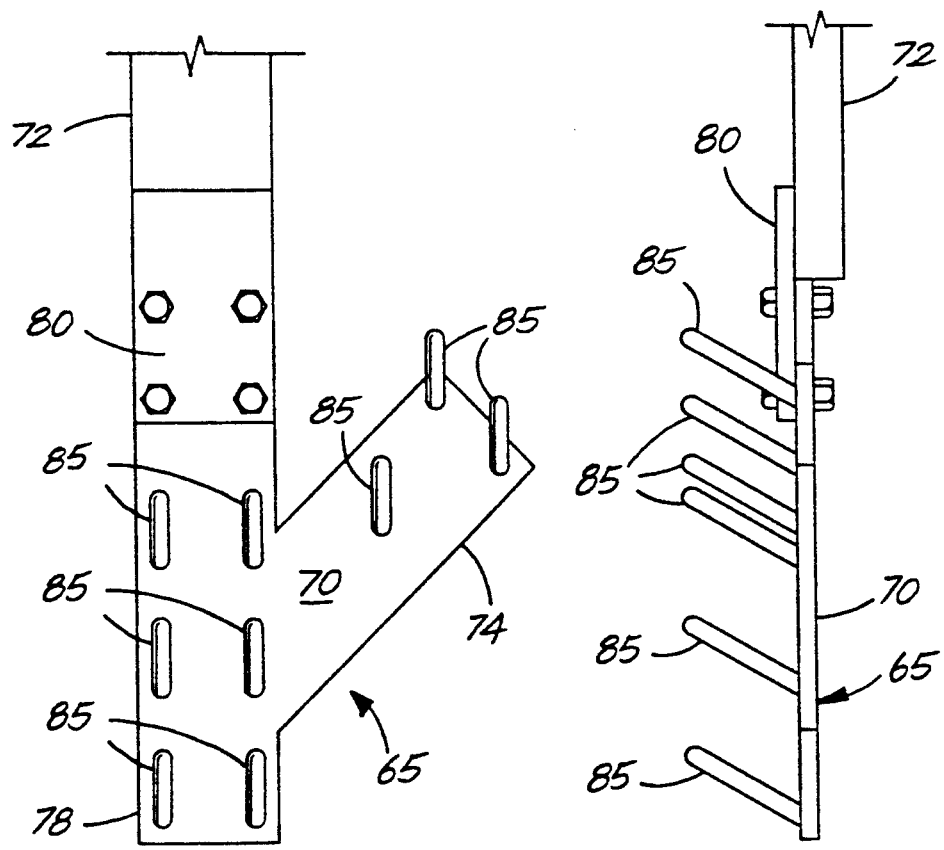
FIG. 4
FIG. 3

BALE CARRYING APPARATUS

BACKGROUND OF THE INVENTION

1. Field of the Invention

The present invention relates to an apparatus for handling hay bales or the like, mounted on a tractor or front end loader. More particularly, the present invention relates to an apparatus for lifting and carrying large, generally cylindrical, hay bales.

2. Description of the Prior Art

The use of cylindrical, large-diameter hay bales has increased in popularity in the United States and other countries. These cylindrical or "round" bales of hay are typically about four to six feet in length and about four to six feet in diameter. The shape and dimensions of a bale may change as a bale settles or is deformed under the weight of other bales in a stack. Weighing generally between 600 and 2000 pounds depending upon moisture content, these bales of hay cannot readily be handled manually. Therefore it is helpful, and generally necessary, to use machinery to lift, carry and stack the large bales.

Various devices are known for handling large-diameter bales. However, no known device offers all of the advantages obtained with the present invention. One known bale carrier is a "grabfork"-type device. The grabfork generally grabs a bale and pushes the bale against the front of a bucket on a loader. No support is provided under the bale, however, and bales will occasionally fall out of a grabfork. In fact, serious injuries can be sustained by farm workers when this happens. The grabfork is further disadvantageous because it tends to tear or break twine on the bale. Grabfork teeth are subject to bending or breaking. Replacement of grabfork teeth is relatively expensive and therefore undesirable. Further, a grabfork device requires considerable room for storage. The grabfork is not particularly convenient for stacking bales, because it require a significant amount of space in order to open and release the bale, and such space may not be available between columns of large diameter bales of hay.

Other known devices for bale carrying include devices having pivotally attached side arms for squeezing a bale therebetween. An example of such a device is shown in Vansickle et al. (U.S. Pat. No. 4,194,863). Vansickle et al. discloses an apparatus including arms which are pivotal towards and away from each other, somewhat like a tweezer. Such an arrangement grips a bale with force that varies according to the diameter of the hay bale. Therefore, this arrangement is not well suited for carrying round bales in both the lengthwise and widthwise direction. Further, compression of the arms against the hay bale tends to force the bale forward when it grips the bale, pushing it away from the tractor. Generally, it is advantageous to keep the bale near the tractor's center of gravity for stability because otherwise the significant weight of the bale may exert sufficient torque to cause the tractor to tip. The closer the bale is carried to the tractor, the safer and more stable is the lifting action. Additionally, the pivotally-attached gripping arms require space in which to open in order to release a bale it has transported or moved, or to address a bale it is to grab. Sufficient space for this is not always available.

Another known hay device for hay bale carrying includes supporting arms which engage the underside of a hay bale. Such a device is shown in Arabshian et al., U.S. Pat. No. 4,364,700. No structure is provided for preventing a hay bale from falling sideways, however, for instance when the tractor is driven on an incline. Further, it is necessary that the bale be carefully positioned or centered on the supporting arms. Such precision positioning tends to slow bale handling.

It is clear, therefore, that there has existed a long unfilled need in the prior art for a hay bale carrier that is readily attachable to a tractor or front end loader and suitable for lifting and carrying a hay bale in either a lengthwise orientation or a widthwise orientation or for grabbing and releasing hay bales in tight spaces where grabforks and pivotally-connected gripping arms are ineffective. A hay bale carrier has been needed that can operate in tight "quarters" and provides sufficient stability and strength to carry a hay bale safely, and without danger of the hay bale falling from the carrying apparatus. Further, a hay bale carrier has been needed that readily centers bales on the device to allow relatively rapid bale handling.

Accordingly, it will be appreciated that there is a need for a bale carrying apparatus which will address this and other problems associated with the prior art devices. The present invention provides advantages over the prior art devices and also offers other advantages and solves other problems associated therewith.

SUMMARY OF THE INVENTION

Accordingly, it is an object of the present invention to provide a device readily attachable to a tractor or front end loader for lifting, transporting, and handling large cylindrical hay bales.

More particularly, an object of this invention is to provide an apparatus including two support arms, which are adapted to slide under the bale, and two side arms or gripping arms, which include gripping plates for holding the bale securely on the apparatus. It is a further objective of this invention to provide gripping arms that are slidable to vary the distance between the gripping arms so that bales can be securely gripped and removed from or placed in narrow spaces just large enough for the bale itself and not providing adequate room for opening the pivotally-connected gripping arms which are common around the prior art devices. It is also an object of the present invention to provide apparatus which can grip a hay bale when it is in either a lengthwise or widthwise orientation with respect to the apparatus. Another object of the present invention is to provide a device which allows rapid bale handling, for instance by allowing convenient positioning of a bale on the support arms. Yet another objective of the present invention is to provide a device that readily performs a number of bale-carrying operations such as loading and unloading bales from, for instance, a flatbed truck, stacking and unstacking bales in pyramid-like or tier formations, placing bales in a feeder or grinder-mixer, and unrolling bales.

In order to achieve the foregoing objects, an apparatus according to the instant invention includes a support frame for attachment to a front end loader; forwardly extending support means for supporting round bales, the support means being interconnected with the support frame and extending forwardly therefrom; first and second forwardly extending gripping arms, the gripping arms being slidably interconnected with said support frame; and manipulation means for manipulating said slidable gripping arms, the manipulation means being constructed and arranged to selectively manipulate said slidable gripping arms such that the gripping arms can cooperate to grip a bale therebetween.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals indicate corresponding-.parts through the several views.

FIG. 2 is a top view of an apparatus illustrated in FIG. 1;

FIG. 3 is a fragmentary top view of an alternate embodiment of the apparatus illustrated in FIG. 1;

FIG. 4 is a fragmentary side elevational view of the apparatus illustrated in FIG. 3;

DETAILED DESCRIPTION OF THE PREFERRED EMBODIMENT(S)

Figure 1:
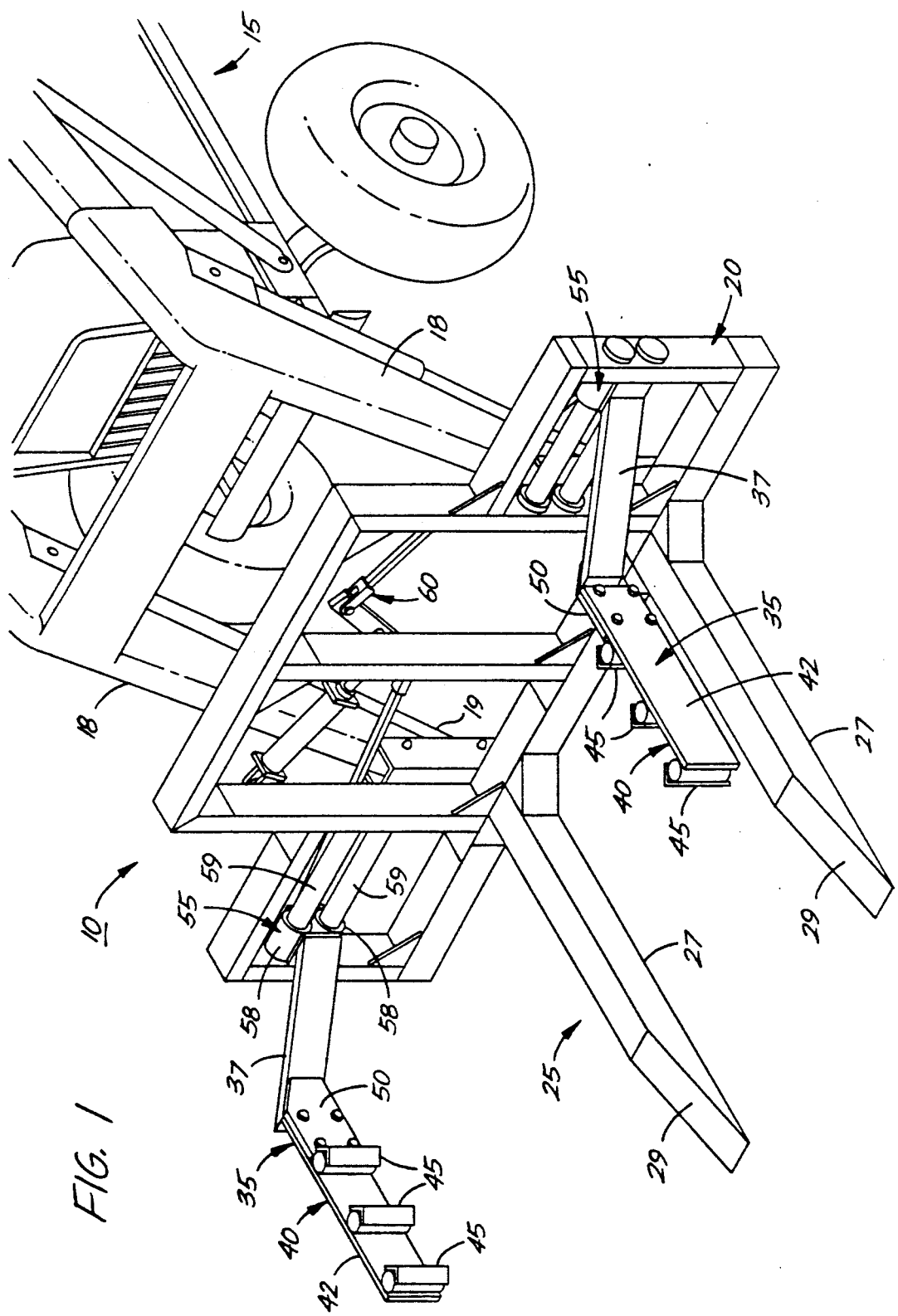
FIG. 1 is a perspective view of an apparatus constructed according to one embodiment of the invention, attached to a front end loader.

Referring now to the drawings, wherein like reference numerals designate corresponding elements throughout the views, and particularly referring to FIG. 1, an apparatus for lifting and handling large hay bales is shown. The bale carrying device 10 is shown mounted on a front end loader 15. The front end loader 15 shown is of a type including two generally parallel lifting arms 18 having distal ends 19 to which the bale carrying device 10 is attached by conventional means. It is to be understood that while the bale carrying device 10 is shown and described as being used with a front end loader, it may be used with other sorts of tractor-like vehicles as well.

The bale carrying device 10 includes a support frame 20 which typically will be fastened directly to the distal ends 19 of a front end loader 15. Support frame 20 extends generally vertically when the front end loader 15 is in its lowermost position, i.e. touching or nearly touching the ground. Preferably, the bale carrying device is fixed to the front of the loader, so that the user will be able to observe the operation of the device 10. It is to be understood, however, that the device 10 might alternatively be fixed to the rear of the tractor-like vehicle. Throughout the description of this invention, the terms "forward", "forwardly", "rear", "rearwardly", and the like, are used with reference to an orientation in which the device is fixed to the front end of a tractor-like vehicle. Such terms expressing orientation are not to be considered in any way limiting.

Support means 25 extend forwardly from the support frame 20. In the embodiment shown in FIG. 1, support means 25 include two generally parallel, spaced-apart support arms 27. Support arms 27 may be fixed to support frame 20 by any conventional means, e.g. welding. Alternatively, support arms 27 may be attached to support frame 20 in a conventional manner such that they may be selectively spaced; i.e. the distance between the support arms 27 may be adjustable by moving the support arms 27 with respect to the support frame 20. The support arms 27 shown in FIG. 1 are bevelled, such that the forwardmost region 29 of the support arms 27 are wedge-shaped to allow the support arms to be slipped readily underneath a bale.

The bale carrying device 10 further includes gripping arms 35 attached to and extending forwardly from the support frame 20. Gripping arms 35 are generally parallel and spaced apart from each other. The gripping arms 35 are spaced vertically from support arms 27. Gripping arms 35 may extend directly forwardly from the support frame, i.e. perpendicular to the support frame. Alternatively, as illustrated in FIG. 1, gripping arms 35 may include an extension member 37 that extends upwardly and forwardly. That is, extension member 37 may define an angle in a vertical with the support frame 20.

Gripping arms 35 include gripping members 40 which, in the most preferred embodiment, extend directly outwardly, or parallel to the support arms 27. Gripping members 40 are adapted to securely engage and hold hay bales, without tearing or slicing the twine holding the hay bale. In the embodiment shown in FIG. 1, the gripping plates include three spaced apart, parallel, vertically extending angle iron portions 45 attached to the gripping plate body by conventional means, such as welding. In the embodiment shown in FIG. 1 gripping plate 42 is secured to extension member 37 by a connector plate 50. A portion of connector plate 50 is welded to extension member 37 such that a portion of extension member 37 extended outwardly from extension member 37. Gripping plate body 42 is bolted to the extended portion of the connector plate 50. It is to be understood that extension member 37 and gripping plate 42 may be connected in any conventional manner. In fact, extension member 37 and gripping plate 42 could be integrally formed.

Gripping arms 35 are slidably mounted on support frame 20. As shown in the embodiment of FIG. 1, member gripping arm 35 is fixed to a bushing arrangement 55. In the embodiment shown in FIG. 1, bushing arrangement 55 includes two cylindrical bearings 58 extending parallel the support frame, i.e. generally parallel to the ground, and transverse to the direction in which the gripping arms and support arms extend. Cylindrical bearings 58 are mounted on shafts 59. The sliding action of the gripping arms will be discussed further below with respect to the manipulation means 60 which causes the gripping arms to be slidably displaced.

FIG. 2 shows an aerial elevational view of the bale carrying device 10 as illustrated in FIG. 1. FIG. 2 shows the support frame 20 from which extends support arms 27 in a forwardly direction. Gripping arms 35 similarly extend forwardly from the support frame 20. Manipulation means 60 are shown disposed behind support frame 20 and will be discussed further below.

FIGS. 3 and 4 show gripping members 65 according to an alternate embodiment for gripping plates 42. Gripping member 40 are interchangeable with gripping members 65 shown in FIGS. 3 and 4. Gripping members 40 are particularly useful for loading, unloading, stacking, removing bales from stack, and placing bale in a feeder or grinder-mixer operations; gripping members 65 are particularly useful for feeding operations. Each gripping member 65 includes a gripping plate 70 that is generally Y-shaped, with a portion 74 extending upwardly and rearwardly from a second portion 78 which extends generally forwardly and parallel to support arms 27. Gripping plate 70 may be attached to an extension member 72 as was described above with respect to gripping plate 40. That is, a connector plate 80 may be used, as described above, or gripping plate 70 may be integral with an extension member 72. Further, extension member 72 may extend upwardly and forwardly as did extension member 37, described above; alternatively, extension member 72 may extend directly forwardly from the support frame.

Gripping plate 70 includes a plurality of elongate, cylindrical teeth 85 which extend inwardly from the gripping plate 70 to grip and hold a hay bale between the gripping arms 35. Preferably, teeth 85 extend inwardly and rearwardly, as illustrated in FIGS. 3 and 4, so that a hay bale between a gripping arms is urged somewhat to the rear of the device, i.e. toward the tractor, to prevent the hay bale from rolling forward off the bale carrying device 10, and to maintain the weight of the bale relatively near the tractor's center of gravity.

Support frame 20 includes a bar extending transversely across the frame to prevent a bale from rolling or falling toward the tractor.

Figure 9:
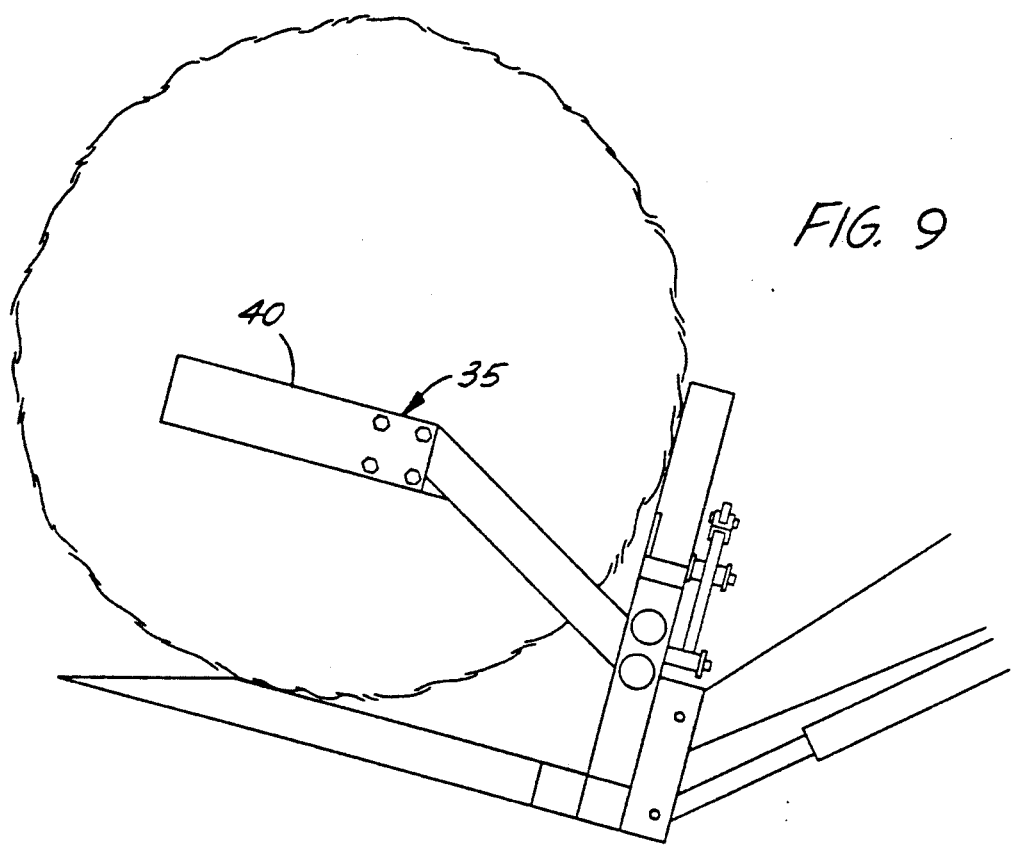
FIG. 9 is a side view of the apparatus illustrated in FIG. 1 in use.
Figure 10:
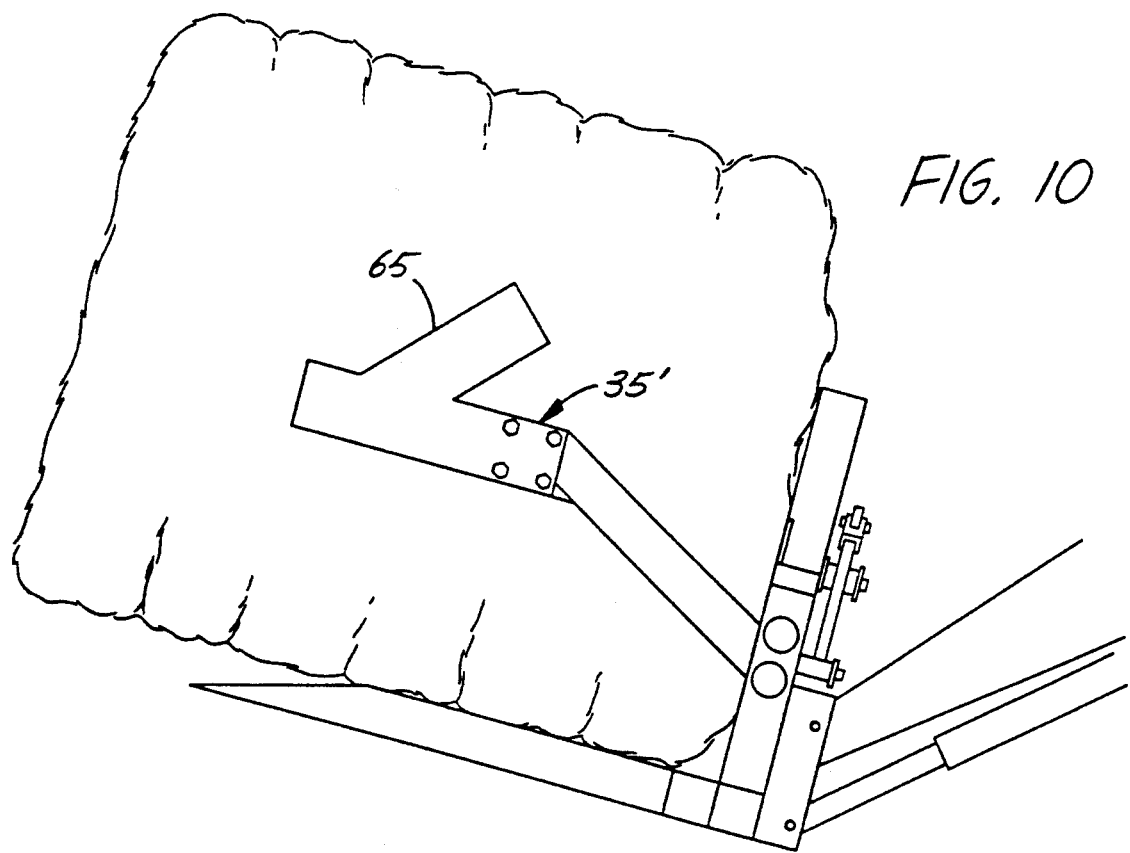
FIG. 10 is a side view of an apparatus constructed according to a second embodiment of the invention in use.

FIGS. 9 and 10 show bale carrying devices according to the present invention in operation. FIG. 9 shows gripping arms including gripping plates 40 of the type shown and described in FIGS. 1 and 2; FIG. 10 shows gripping arms 35' having gripping members 65 as shown and described with respect to FIGS. 3 and 4. It is to be understood from FIGS. 9 and 10 that the arrangements described allow for hay bales to be carried in widthwise fashion or in a lengthwise fashion. FIG. 9 shows a hay bale being carried widthwise; that is with the longitudinal axis of the hay bale being generally perpendicular to the gripping arms 35'. FIG. 10 shows a hay bale being carried lengthwise; that is, with the longitudinal axis of the hay bale being generally parallel to the gripping arms 35'. To accommodate the different orientations, the gripping arms 35 are adapted to be slidably displaced relative to one another to vary the distance therebetween.

Figure 5:
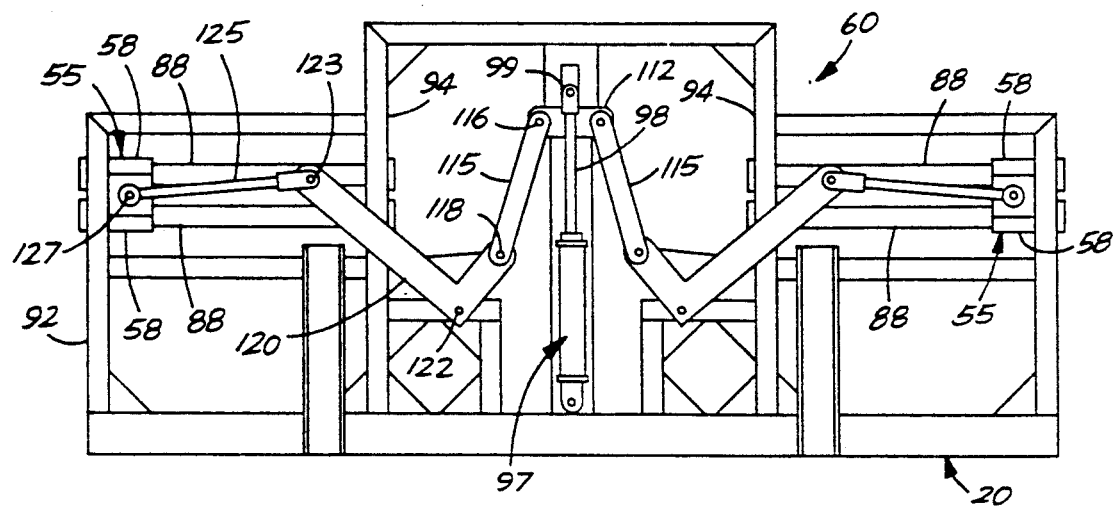
FIG. 5 is a rear elevational view of a manipulation mechanism of the apparatus illustrated in FIG. 1 in a first position.
Figure 6:
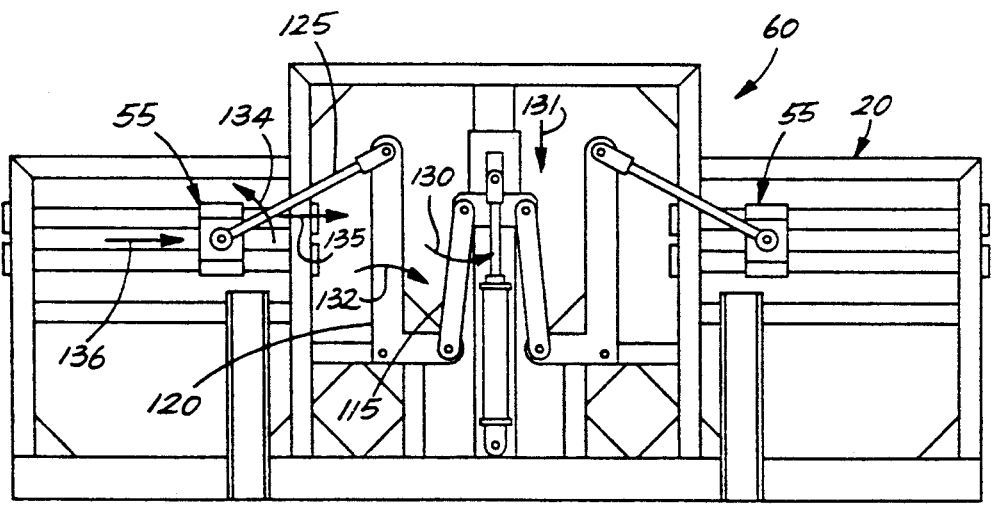
FIG. 6 is a rear elevational view of the apparatus illustrated in FIG. 5, shown in a second position.

FIGS. 5 and 6 show a first, preferred embodiment of a manipulation mechanism 60 for slidably displacing gripping arms 35 to vary the distance between the gripping arms 35. Generally, gripping arms 35 or 35' are slidable between a first position, wherein manipulation mechanism 60 is in the position illustrated in FIG. 5, and a second position in which the manipulation mechanism 60 is in the position shown in FIG. 6. As described above, cylindrical bearings 58 in bushing arrangements 55 are slidably mounted on shafts 88 extending transversely within support frame 20. In the embodiment shown in FIG. 5, shafts 88 are supported between an outer frame member 92 and an inner frame member 94.

It is to be understood that the left-hand portion of the frame and manipulation mechanism is identical to the right-hand portion of the frame and manipulation mechanism, where "left" and "right" describe the orientation shown in FIG. 5 and are not to be considered in any way limiting. Extending vertically at the center of the support frame 20 is an actuator 97. A preferred actuator 97 is a hydraulic cylinder with a shaft 98 extending therefrom. A linkage 110 extends between the end of shaft 98 and the bushing arrangement 55, such that movement of shaft 98 by actuator 97 results in sliding displacement of the bushing arrangements 55, and thereby causes linear displacement of the gripping arms 35.

The linkage shown in FIGS. 5 and 6 includes a cross member 112 mounted for vertical sliding displacement within frame 20. Cross member 112 is fixed to end 99 of shaft 98 directly, such that movement of end 99 corresponds directly to vertical displacement of cross member 112.

A first bar 115 is pivotally attached at one end to cross member 112. And a second opposite end, first bar 115 is pivotally attached at 116 to cross bar 112. At a second opposite end, first bar 115 is pivotally attached at 118 to a second bar 120. Second bar 120 is a two-bar member that includes three, non-linear pivot points: 118 (discussed above), 122 and 123. Pivot joint 122 pivotally attaches the second bar 120 to a stationary point on frame 20. Second bar 120 is connected at pivot 123 to a third bar 125. Third bar 125 is connected to bushing arrangement 55 at pivot joint 127. As described above, bushing arrangement 55 is slidably attached to the shafts 88 which are fixed in frame 20.

Operation of the linkage, and relative movement of the members of the linkage, can be understood by a comparison between FIGS. 5 and 6. In FIG. 5, the bushing arrangements are shown in a first position in which they are spaced apart as far as frame 20 will allow. In this position, shaft 98 is fully extended from actuator 97. To slide the gripping arms 35 or 35' together, so that they are closer together, the actuator 97 is actuated, causing shaft 98 to retract as shown in FIG. 6. Such a retraction pulls cross member 112 in a downward direction. First bar 115 is similarly pulled downward and rotated in a counter-clockwise direction as indicated by arrow 130. Second bar 120 is thereby rotated in a clockwise direction as indicated by arrow 132. When bar 120 rotates clockwise, bar 125 is slidably displaced to the center of the frame, as illustrated by arrow 135, and is rotated in a counter clockwise direction as indicated by arrow 134. Bushing 55 is slidably displaced toward the center of the support frame 20 as indicated by arrow 136. In this manner, gripping arms 35 or 35' are moved from a first outward position as shown in FIG. 5 to a second inward position as shown in FIG. 6.

Figure 7:
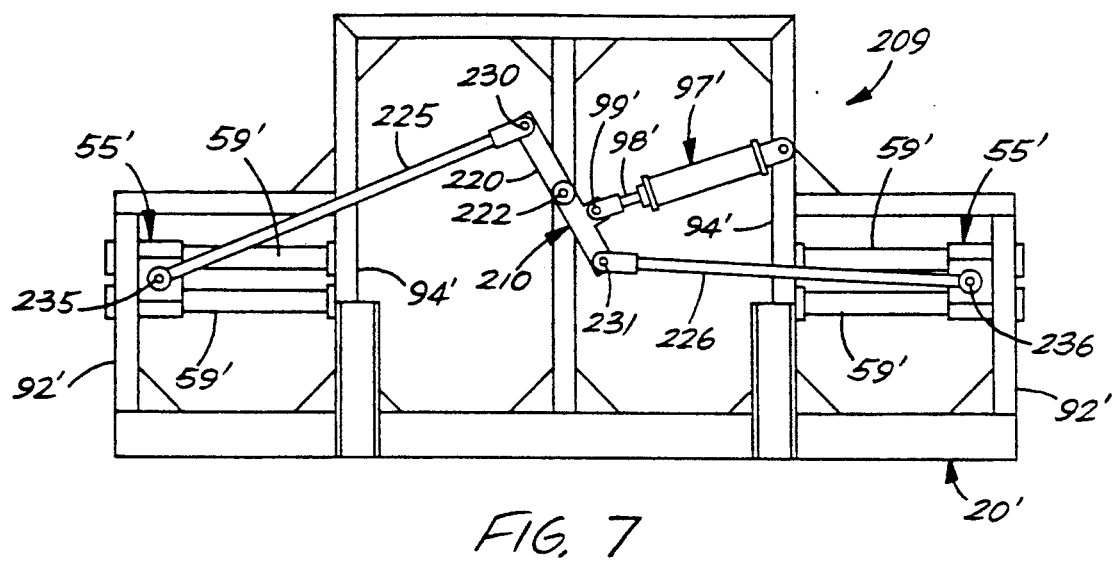
FIG. 7 is a rear elevational view of manipulation means according to an alternate embodiment of the invention, shown in a first position.
Figure 8:
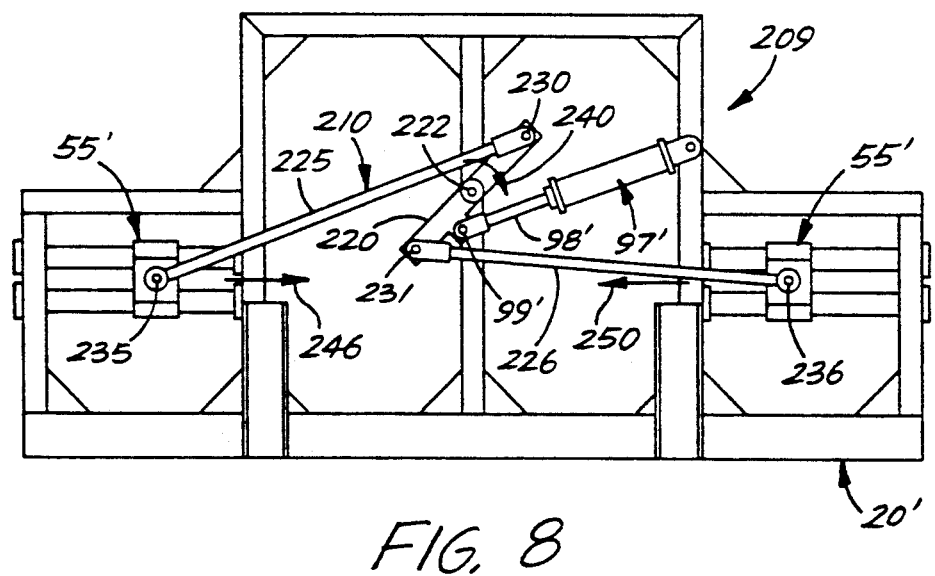
FIG. 8 is a rear elevational view of the manipulation means illustrated in FIG. 7, shown in a second position.

A second manipulation mechanism 209 is illustrated in FIGS. 7 and 8. FIG. 7 shows the manipulation mechanism arranged in a first position in which the bushings 55' are outwardly extended as far as permitted by frame 20; FIG. 8 shows bushing arrangements 55' in a second inward position. Bushing arrangements 55' are slidably attached to shafts 59'. Shafts 59' are fixed within frame 20' and extend between outer frame 92' and inner frame member 94'. An actuator 97' is fixed to inner frame member 94' and includes a shaft 98' with an end 99'. A linkage 210 extends between the actuator end 99' and the bushing arrangements 55', by which movement of actuator shaft 98' results in linear displacement of bushing arrangements 55'. The linkage 210 includes a center bar 220 pivotally attached at its middle to the support frame 20' at its center in the widthwise direction. First bars 225 and 226 are pivotally attached to center bar 220 at pivots 230 and 231, respectively. Bar 225 is pivotally attached to bushing 55' at pivot 235. Pivot 235 is generally located at an end of bar 225 opposite the end of bar 225 including pivot 230. Similarly, bar 226 is attached to bushing arrangement 55' at pivot 236, where pivot 236 is located at an end of bar 226 opposite the end of bar 226 including pivot 231. As discussed above, bushing 55 is slidably mounted on shafts 59' which are attached to frame 20'.

Operation of, and relative movement between members of the manipulations means 209 can be understood by a comparison between FIGS. 7 and 8. The bushings 55' are illustrated in FIG. 7 in their outermost position. That is, bushings 55' are spaced apart as far as frame 20' will permit. At this position shaft 98' is substantially retracted in actuator 97. To draw the bushings 55' closer together, actuator 97' causes shaft 98' to be extended, as shown in FIG. 8. Upon extension, center bar 220 is rotated clockwise about pivot 222, due to the force exerted by shaft 98' on center bar 220 at pivot 99'. Motion of the center bar is indicated in FIG. 8 at arrow 240. As center bar 220 moves in a clockwise direction, bar 225 moves in a counter-clockwise direction about pivot 235 until center bar 220 is vertical. Continued movement of center bar 220 in a clockwise direction will cause bar 225 to move in a clockwise direction about pivot 235, as well as in a linear direction as indicated by arrow 246. Linear movement is described with respect to frame 20'. Bar 226 will move in a counter-clockwise direction until center bar 220 is vertical. Continued movement in this direction, however, will cause bar 226 to move in a clockwise direction with respect to pivot 236. Bar 226 moves linearly inward in the direction indicated at arrow 250. Bushings 55' slide inwardly on shafts 59', thereby moving gripping arms 35 or 35' closer together. The bale carrying device may be used to lift and carry bales, by opening or spreading the gripping arms 35 or 35' wide enough to receive a bale, therebetween endwise or widthwise, as desired; moving the tractor forward, with the support arms sliding underneath the bale; and closing, or squeezing together, the gripping arms 35 or 35'.

The bale carrier is adapted to perform additional operations, such as unrolling a bale of hay. The operator puts the bale of hay on the ground in front of the tractor with the gripping arms 35 or 35' fully extended and places the bale carrier in the most forward tilt position by positioning the lifting arms 18 and unrolls the bale with the support arms to the desired position and then grasping the bale with the gripping arms 35 or 35' and lifting the bale to carry to another position to unroll an additional part of the bale. Gripping plates 40 are preferred for an unrolling operation.

Another function for the bale carrying device 10 is to place bales in a feeder or grinder-mixer. With this application gripping plate 65 is preferred and the bale is preferably have to be picked up from the end. Typically, the operator will drive up to the end of a bale of hay and extend the gripping arms 35 or 35' and gripping plate 65 to the outermost position and then drive forward to place the supporting arms under the bale, and gripping arms 35 along the side of the bale. When the operator has the carrying device 10 in the desired position with respect to the bale, the operator will activate the actuator 97 or 97' to grasp the bale. The operator is then ready to transport the bale to the feeder or place in the grinder-mixer by raising the loader to the desired height and then tilting the carrier to the most forward position to be placed in the feeder or grinder-mixer. The operator will then lower the bale to the desired position and then release the grasp form the bale.

It is to be understood that even though numerous characteristics and advantages of the present invention have been forth in the foregoing description, together with details of the structure and function of the invention, the disclosure is illustrative only, and changes may be made in detail, especially in manners of shape, size and arrangement of parts within the principals of the invention to the full extent indicated by the broad general meaning of the terms in which the appendant claims are expressed.

What is claimed is:

1. A bale handling device for attachment to a front end loader having first and second forwardly extending lifting arms, said bale handling device comprising:
    (a) a support frame for attachment to the front end loader, said support frame including connection means for interconnecting said support frame to the lifting arms;
    (b) forwardly extending support means for supporting single round bales, said support means being interconnected with said support frame and extending forwardly therefrom, wherein forwardly extending means extending away from the front end loader and rearwardly extending means extending toward the front end loader when said frame is interconnected therewith;
    (c) first and second forwardly extending gripping arms, said gripping arms spaced apart to receive a bale therebetween, said gripping arms being slidably interconnected with said support frame; and
    (d) manipulation means for manipulating said slidable gripping arms, said manipulation means being constructed and arranged to selectively manipulate said slidable gripping arms such that said gripping arms can cooperate to grip the bale therebetween; wherein said manipulation means include a hydraulic actuator fixed to the support frame, and a linkage connecting the actuator to the gripping arms, such that actuating the actuator causes the gripping arms to be mutually slidably displaced to vary the distance between the gripping arms; and wherein each of the gripping arms are fixed to a cylindrical bearing, the cylindrical bearing being mounted on a shaft fixed to the support frame for linear movement thereon.

2. A bale handling device according to claim 1, wherein said gripping arms include a plurality of protrusions extending inwardly from said gripping arms for gripping a bale.

3. A bale handling device according to claim 2, wherein said protrusions include elongate, cylindrical teeth extending inwardly and rearwardly toward said support frame, to urge a bale between said gripping arms toward said support frame.

4. A bale handling device according to claim 2, wherein said protrusions include angle-iron portions, having a right-angular surface for engaging a bale.

5. A bale handling device according to claim 1, wherein each of said gripping arms are fixed to a cylindrical bearing, said bearing being mounted on a shaft fixed to said support frame for linear movement thereon.

6. A bale handling device according to claim 1, said support means including at least two forwardly extending support arms, wherein said gripping arms extend forwardly from said support frame, and generally parallel to said support arms.

7. A bale handling device according to claim 1, wherein each of said gripping arms includes an extension member having first and second opposite ends, one end being fixed to said support frame and extending forwardly and upwardly therefrom, and each of said gripping arms further including gripping plates fixed to said second end of said extension member.

8. A bale handling device according to claim 7, wherein each said gripping plate includes an upwardly and rearwardly extending portion; said gripping plate including elongated, cylindrical teeth extending outwardly from said gripping plate.

9. A bale handling device according to claim 1 wherein said support frame includes means for preventing a bale from falling rearwardly toward the tractor.

10. A bale handling device according to claim 1, wherein said support means include two generally parallel, spaced apart support arms, each support arm having first and second opposite ends, one of said ends being fixed to said support frame.

11. A bale handling device according to claim 10, wherein each of said support arms is adjustably attached to said support frame such that each of said support arms can be selectively positioned on said support frame.

12. A bale handling device according to claim 10, wherein said opposite end of each said support arm is wedge-shaped.

13. A bale handling device according to claim 1, wherein each gripping arm is slidable between first and second positions, said gripping arms being generally parallel to one another in said first position and in said second position.

* * * * *